(12) United States Patent
Schwarz

(10) Patent No.: US 8,401,854 B2
(45) Date of Patent: Mar. 19, 2013

(54) SPEECH RECOGNITION ON LARGE LISTS USING FRAGMENTS

(75) Inventor: Markus Schwarz, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1099 days.

(21) Appl. No.: 12/355,476

(22) Filed: Jan. 16, 2009

(65) Prior Publication Data

US 2009/0210230 A1 Aug. 20, 2009

(30) Foreign Application Priority Data

Jan. 16, 2008 (EP) ..................................... 08000772

(51) Int. Cl.
 *G10L 15/04* (2006.01)
(52) U.S. Cl. ........................................................ 704/252
(58) Field of Classification Search .................... 704/252
 See application file for complete search history.

(56) References Cited

U.S. PATENT DOCUMENTS

| | | | |
|---|---|---|---|
| 6,065,003 A | 5/2000 | Sedluk | 707/6 |
| 6,571,210 B2 | 5/2003 | Hon et al. | 704/251 |
| 6,839,669 B1 * | 1/2005 | Gould et al. | 704/246 |
| 6,850,886 B2 | 2/2005 | Abrego et al. | 704/240 |
| 6,985,861 B2 | 1/2006 | Van Thong et al. | 704/254 |
| 7,155,061 B2 * | 12/2006 | Lui et al. | 382/186 |
| 7,277,029 B2 * | 10/2007 | Thiesson et al. | 341/22 |
| 7,529,657 B2 * | 5/2009 | Wang et al. | 704/9 |
| 2001/0018654 A1 | 8/2001 | Hon et al. | 704/257 |
| 2001/0049600 A1 | 12/2001 | Abrego et al. | 704/240 |
| 2002/0007379 A1 * | 1/2002 | Wang et al. | 707/515 |
| 2003/0110035 A1 | 6/2003 | Thong et al. | 704/254 |
| 2004/0260681 A1 | 12/2004 | Dvorak | 707/3 |
| 2006/0290535 A1 * | 12/2006 | Thiesson et al. | 341/22 |
| 2007/0136060 A1 | 6/2007 | Hennecke et al. | 704/251 |

FOREIGN PATENT DOCUMENTS

| | | |
|---|---|---|
| EP | 0 651 372 A2 | 5/1995 |
| EP | 1 734 509 A1 | 12/2006 |
| EP | 2 081 185 A1 | 7/2009 |
| WO | WO 2004/077405 A1 | 9/2004 |
| WO | WO2004/077405 A1 * | 10/2004 |

OTHER PUBLICATIONS

Hu, et al.; Speech Recognition Using Syllable-Like Units; Center for Spoken Language Understanding, Oregon Graduate Institute of Science and Technology; pp. 1117-1120, 1996.

Shafran, et al.; Use of Higher Level Linguistic Structure in Acoustic Modeling for Speech Recognition; Department of Electrical Engineering, University of Washington, Seattle, WA, 2000; pp. 1021-1024.

* cited by examiner

*Primary Examiner* — Michael N Opsasnick

(74) *Attorney, Agent, or Firm* — Sunstein Kann Murphy & Timbers LLP

(57) ABSTRACT

A system and method is provided for recognizing a speech input and selecting an entry from a list of entries. The method includes recognizing a speech input. A fragment list of fragmented entries is provided and compared to the recognized speech input to generate a candidate list of best matching entries based on the comparison result. The system includes a speech recognition module, and a data base for storing the list of entries and the fragmented list. The speech recognition module may obtain the fragmented list from the data base and store a candidate list of best matching entries in memory. A display may also be provided to allow the user to select from a list of best matching entries.

27 Claims, 4 Drawing Sheets

SPEECH RECOGNITION ON LARGE LISTS USING FRAGMENTS

RELATED APPLICATIONS

This application claims priority of European Patent Application Serial Number 08 000 772.7, filed on Jan. 16, 2008, titled SPEECH RECOGNITION ON LARGE LISTS USING FRAGMENTS, which application is incorporated in its entirety by reference in this application.

BACKGROUND OF THE INVENTION

1. Field of the Invention

This invention relates to speech recognition, and in particular, to methods for selecting entries from lists of entries in a speech recognition system.

2. Related Art

Speech recognition is being used as a user input to control the operation of a variety of systems. For example, navigation systems allow a user to speak requests for navigation information, such as directions to a destination. Telecommunications devices such as telephones, cell phones, etc. use speech recognition for functions such as name dialing. Some audio/video systems use speech recognition for audio or video player control. Speech recognition systems typically operate by matching voice patterns with information relevant to the application. For example, in a navigation system, the information may include information such as, city names, street names, proper names, addresses or music titles etc. The information relevant to the application is typically stored as a list of entries in a data structure. The data structures are typically stored in memory in the system employing the speech recognition.

The volume of information relevant to the application that is matched with the voice patterns is typically quite large. In operation, the speech recognition function must often select an entry from a large list of entries, which may require a large amount of memory for processing. Many systems that employ speech recognition may only have a moderate amount of memory available for processing.

Speech recognition may be implemented in systems with a moderate of memory for processor resources using a two-step approach. In a first step, a phoneme sequence or string is recognized by a speech recognition module. The accuracy of phoneme recognition is usually not acceptable and many substitutions, insertions and deletions of phonemes occur in the process. The recognized speech input, such as the phoneme string, is then compared with a possibly large list of phonetically transcribed entries to determine a shorter candidate list of best matching items. The candidate list may be supplied to a speech recognizer as a new vocabulary for a second recognition path. Such an approach saves computational resources since the recognition performed in the first step is less demanding and the computational expensive second step is only performed with a small subset of the large list of entries.

The computational effort required in cases involving very large lists may still be quite large. In a navigation system that uses speech-driven control, the user, or driver/speaker, may utter a combination of words to provide the information that identifies the destination, such as a city combined with a street in the city of destination. To illustrate in an example, there are about three million city-street combinations in Germany, which would require a very large list of entries. When the recognition step is to be carried out on such a large list, a matching step as described above would require memory and matching run time resources that may preclude incorporating the function in an embedded system in a vehicle. These large lists may also exist in other fields of application such as when selecting the name of an artist, song of an artist, e.g., when a voice controlled selection of a song should be incorporated into a product.

There exists a need for methods able to perform speech recognition involving very large lists of entries for information relevant to the application.

SUMMARY

In view of the above, a speech recognition method in which an entry corresponding to a speech input is selected from a list of entries is provided. In an example method, the speech input is detected and recognized. Fragments of the entries in the list of entries are provided. The recognized speech input is compared to the list of entries to generate a candidate list of best-matching entries based on the comparison result. The candidate list is generated by comparing the recognized speech input to the fragments of the entries.

In another aspect of the invention, an example of a speech recognition system in which a speech input is used to select an entry from a list of entries is provided. The system includes a data base having a list of entries and a list of fragments. Each fragment represents a part of one entry. The system also includes a speech recognition module configured to recognize a speech input and to compare the recognized speech input to the list of entries in order to generate a candidate list of best matching entries based on the comparison result. The candidate list is generated by comparing the recognized speech input to the fragments of the entries.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
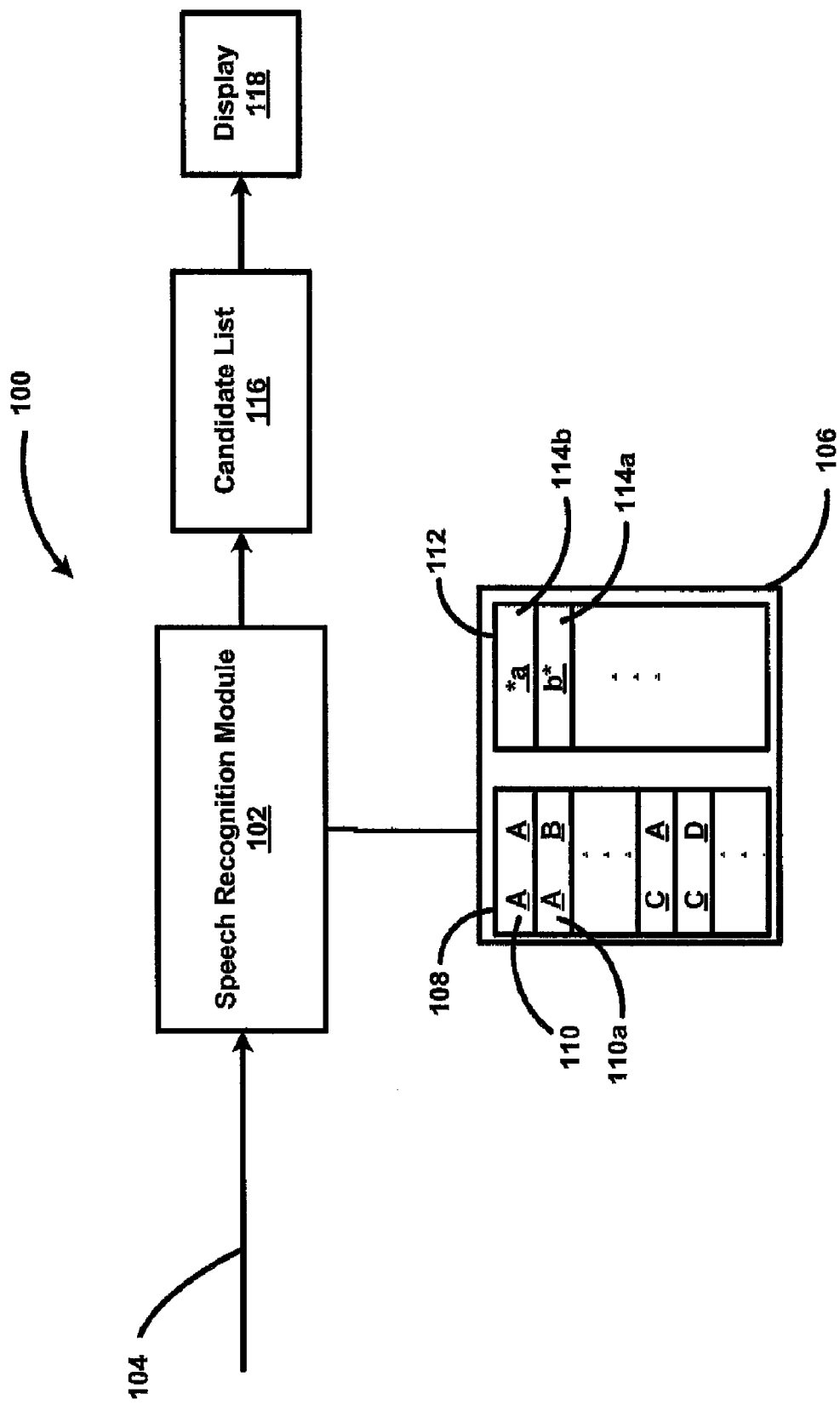
FIG. 1 is a block diagram of a speech recognition system using fragment-based recognition to select an entry from a large list of entries.

FIG. 1 is a block diagram of a speech recognition system 100 using fragment-based recognition to select an entry from a large list of entries. The system 100 in FIG. 1 may be used, for example, for speech-driven selection of a destination location of a vehicle, for the selection of a media file from a media data base, to select personal names in an address book, or in other systems that may implement speech input to control operation of the systems. The speech recognition system 100 may be used in a vehicle environment or in a system operating as a stand-alone unit used in a non-vehicle environment.

The speech recognition system 100 includes a speech recognition module 102 configured to receive a speech input from a user 104. The speech recognition module 102 is used in connection with a data base 106 that includes a list 108 of entries 110. The list 108 of entries 110 may include city street combinations for a predetermined geographical region, such as a country or even several countries. FIG. 1 depicts an example of the entry 110a, which is a combination of a city A and an address, such as a street B. A more specific example of the entry 110b may be as follows: Frankfurt Lindenstrasse or Ulm Olgastrasse München Wettersteinplatz etc.

In addition to the original list 108 of entries 110, the data base 106 may also include a fragment list 112 of fragmented entries 114. Each fragmented entry 114 includes fragments of corresponding entries 110 in the list 108. The fragment list 112 may include fragmented entries 114 for all of the entries 110 in the list 108.

The fragment list 112 may be generated by fragmenting each entry 110 on a phoneme or some other sub word level. The entries 110 may be fragmented according to various performance factors, such as, for example, expected recognition rate, memory requirement and runtime performance. For example, in the data base 106 containing city street combinations, the entries 110 may be fragmented between city and street, at a minimum to reduce memory requirements for storing the data. Longer city or street names may also be further fragmented. An example of various entries 110 of different city-street combinations illustrating such fragmentation is shown below in Table A.

TABLE A

| Entries 110 | | Fragmented Entries 114 |
|---|---|---|
| Frankfurt Lindenstrasse | ⇒ | Frank\|furt\|Linden\|strasse |
| Ulm Olgastrasse | ⇒ | Ulm\|Olga\|strasse |
| München Wettersteinplatz | ⇒ | Mün\|chen\|Wetter\|stein\|platz |
| Hamburg Steinstrasse | ⇒ | Ham\|burg\|Stein\|strasse |

The example fragmented list 112 above depicts the orthography for purposes of illustration. In the fragment list 112, the fragmented entries 114 may be stored as phonetically transcribed versions of the entries 110 to compare the fragmented entries 114 to the recognized phonetic string of the speech input 104. As shown in the above-described examples, several of the previously disjoint entries 110 are now shown to include common fragments, such as "strasse" and "stein." That is, by generating the fragmented list 112, entries 110 having common fragments may be identified. When the speech input 104 includes phonetic strings that match a common fragment, the fragmented entries containing the common fragment may be identified and stored in another list. As a result, the list of unique or different fragments left to match to other phonetic strings in the speech input 104 may become shorter than the original list 108. The difference between the size of the list of fragmented entries and the original list 108 of entries 110 is greater as the size of the original list 108 of entries 110 becomes larger.

Another effect of generating the fragmented list 112 is that the fragmented entries 114 themselves are shorter than the complete entries 110 in the original list 108. The shorter fragmented entries 114 make the process of recognition, or of finding matches to speech input 104, easier. Shorter fragmented lists 112 and shorter fragmented entries 114 help to optimize and accelerate the recognition of speech for the selection of an entry in large lists of entries.

The fragmented list 112 in FIG. 1 shows fragmented entries 114 that are accompanied by a wildcard, which is represented in FIG. 1 by the '*.' The wildcard represents the part of the entry that was not considered when the fragmented entry 114 of the entry 110 was generated. The wildcard '*' may be used to indicate parts of the original entry 110 that are not to be considered in matching fragmented entries 114 to the speech input 104 in a first pass at performing speech recognition. The wildcard may match uniformly against everything else such that the fragment itself would match precisely against the part of the speech input associated with it, and every other part of the speech input matches against the wildcard(s). Even when the influence of the wildcard during the matching step cannot be completely avoided, its influence should be minimized. The weight of the wildcard may be determined by calculation or empirical testing.

In the fragmented list 112, the fragment entry 114a containing the fragment 'a' has a wildcard '*' on the left side indicating parts on the left side of the original entry 110 that will not be considered in a first pass at speech recognition. The fragmented entry 114b includes the fragment 'b' has a wildcard on the right side. Wildcards may be provided on both sides of a fragment. Shorter entries 110 may not be fragmented, so that the fragmented entry 114 may include the entire entry 110. Unfragmented entries in the fragmented list do not include any wildcards.

It is also possible that the entries 110 in the list 108 of entries 108 also include wildcards. These wildcards may be used to indicate that the user not only utters the name of the entry 110, but that the entry 110 is part of a complete sentence (e.g., "please guide to Lindenstraße in Munich").

FIG. 1 shows fragmented entries 114 using '*' as the wildcard. Examples of such a fragmented entry 114 may be *strasse or *olga* etc. Different symbols may be used for the wildcards to indicate wildcards with different attributes. For example, a different symbol may be used on the left and on the right side, such as for example, *olga$. The different symbols may indicate a different weighing of the two wildcards.

In the system 100 in FIG. 1, the speech recognition module 102 may carry out a first pass of speech recognition for recognizing the speech input, e.g., using an open phoneme loop or some other subword unit, the recognized speech input is compared to the fragmented list 112 in order to determine the best matching fragments. A candidate list 116 may be generated on the basis of the fragment matching by calculating the best matching entries. The list of best matching entries corresponds to the candidate list 116. The candidate list 116, which may be shorter than the original list 108, may be used to generate a list of the M best matching entries that may be shown to the user for further selection. The candidate list 116 may also be used in a two-step speech recognition method where another pass at recognition is performed on the shorter candidate list 116. In the additional pass at recognition, the most likely entry 108 in the list 108 for the same speech input as that used in the first pass at recognition may be determined by matching phonetic acoustic representations of the entries listed in the candidate list 116 to the acoustic input and determining the best matching entry or entries. The second pass at recognition may typically require more computing power than the first pass at recognition. In order to reduce computing time, the number of entries in the candidate list 116 is reduced compared to the number of entries 110 in the list 108. For example, the large list 108 of entries 110 may include several hundreds of thousands or millions of entries 110. The candidate list 116 of best matching entries may be much shorter, and may have for example, several hundreds or several thousands of entries. The second pass at recognition may then be carried out on the candidate list 116 that is much shorter than the original list 108. The best matching results of the second pass may be displayed on a display 118. The second pass at recognition is not, however, necessary. It is possible that only one pass at recognition is performed.

Figure 2:
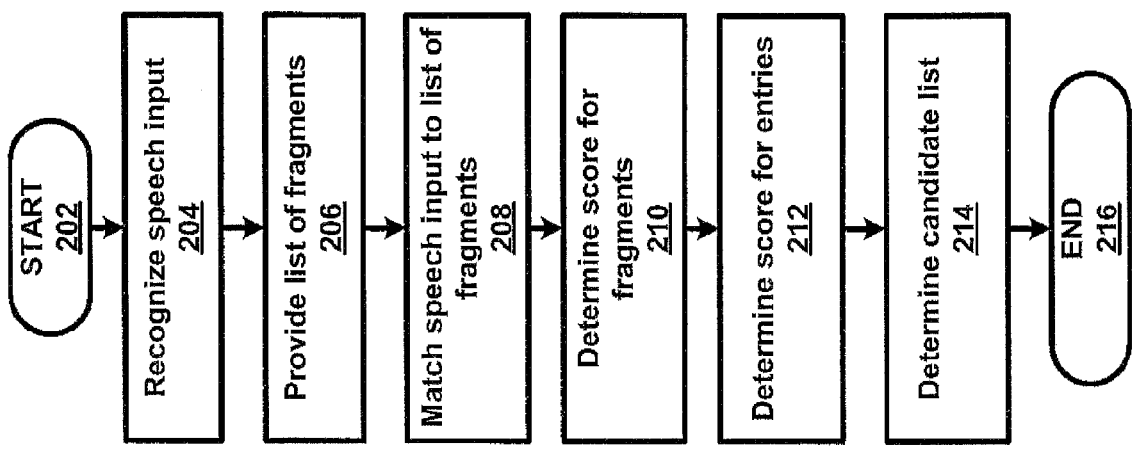
FIG. 2 is a flow chart illustrating operation of an example speech recognition method using fragment-based recognition.

FIG. 2 is a flow chart illustrating operation of an example speech recognition method 200 using fragment-based recognition. The method may start at step 202 by invoking a computer program, or a software module, configured to perform the speech recognition. The speech input 104 (in FIG. 1) is recognized at step 204. In step 204, a phoneme sequence or string is recognized by the speech recognition module 102 (in FIG. 1), for example. Once the phoneme sequence of the speech input 104 is generated the list of fragments 112 (in FIG. 1) may be provided at step 206. The list 112 of fragments 114 (in FIG. 1) may be predetermined and stored in memory in the system. The list 108 of entries 110 may be variable, in which case, the fragmented list 112 of fragmented entries 114 may be generated dynamically, at any point before performing a matching step. The recognized phoneme string is compared to the fragmented list 112 of fragmented entries 114 at step 208 to determine any matching fragments. In order to determine how well the recognized phoneme string corresponds to the matched fragment, a score may be determined for each fragment entry 114 of the fragmented list 112 at step 210. The scores of the different fragments may be used to determine a score for the list 108 of entries 110 at step 212. In addition, it is known by which fragments the complete entry 108 is concatenated. The scores of the different fragments building the entry 110 may be added to determine a score for the entire entry 110. Depending on the score, the candidate list 116 of best matching entries may be determined at step 214. The candidate list 116 may be used for an additional pass at matching. Alternatively, the best matching entries may be displayed to the user for further selection or confirmation. The second pass at recognition may be performed using known matching techniques and therefore, not described in any further detail. Once an entry is selected, the method ends at step 216.

Figure 3:
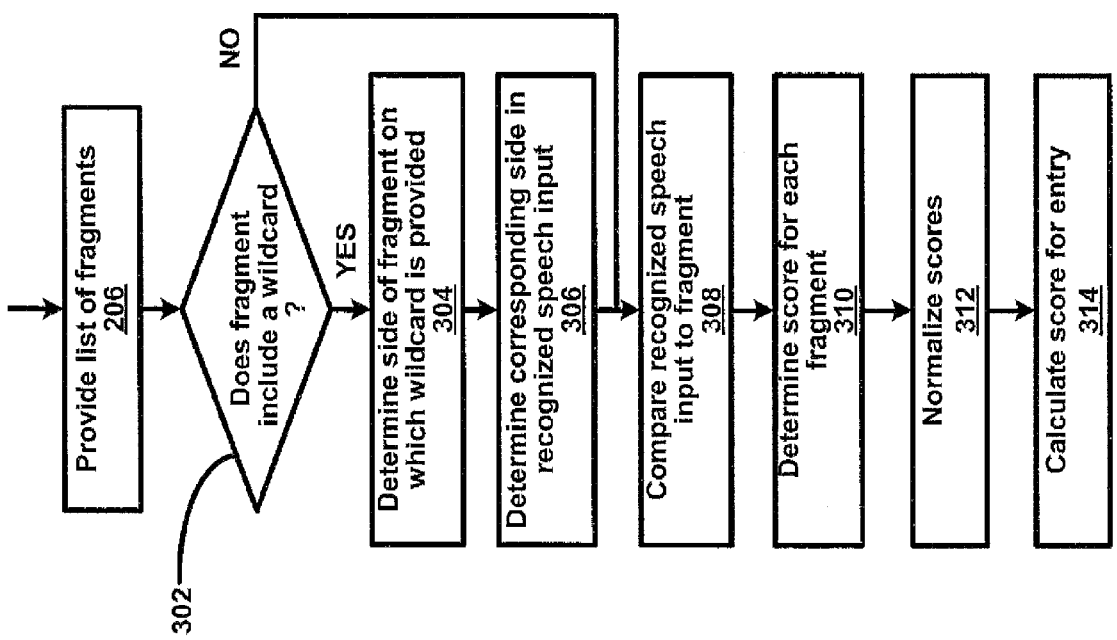
FIG. 3 is a flow chart illustrating another example of fragment-based recognition.

FIG. 3 is a flow chart illustrating another example of fragment-based recognition. FIG. 3 shows an example in which wildcards are added to the fragments. The method illustrated in FIG. 3 may proceed substantially similar to the method shown in FIG. 2 up to step 206, in which the fragmented list 112 is provided. After the fragmented list 112 is provided in step 112, decision block 302 determines whether or not a fragment includes a wildcard. If one of the fragments includes a wildcard, the side on which the wildcard is included is determined at step 304. If the fragment is a border fragment, the location of the fragment and where it may appear in an utterance may be better modelled a wildcard is not provided on both sides of every fragment. For example, the fragment "*strasse" may usually be matched against the right most part of the utterance in an example in which list 108 of entries 110 includes a city-street pair. At step 306, the corresponding side in the original speech input is determined. As a consequence, when the combination '*fragment' is provided, the left part of the corresponding recognized speech input will be less considered or not considered at all. When the combination is 'fragment*' only the first part, or the left part of the recognized speech input will be considered in the matching. It is possible to use different variants for the same fragment. For example, *strasse and strasse* may be used if there are entries such as "strassenhausen" and "olgastrasse." This may lead to a better scoring of the matches. When only one side of the recognized speech input is considered, the matching process becomes faster. The matching of only the right and left part of utterances may be performed by matching from the right side in combination with an appropriate pruning mechanism. This precludes the need for an a priori guess for the cut-off point in the utterance. If no wildcard is detected in the fragment, the recognized speech input is directly compared to the fragment at step 308.

In one example implementation, the fragmentation need not result in the concatenation of the fragments in order to result in the original entry 110. The fragments may overlap, or the fragments may only cover a part of the entry 110. Nevertheless, it is possible to carry out a matching step with overlapping fragments, which may improve the matching accuracy. For the comparison step in step 308, a context sensitive Levenshtein distance or some other suitable matching algorithm may be used. The Levenshtein algorithm, which is known in the art, calculates the least number of edit operations necessary to modify one string to another string. Typically, this may be calculated by a dynamic programming approach using a matrix. The edit operations that may be needed to change the first string to the second string may be seen in the matrix. If a weighted algorithm is used, the costs for changing one character to the other may not be constant.

In one example implementation, the costs may be made dependent on the context. Any other matching algorithm may also be used. When the recognized speech input is matched to the fragments, a score for each fragment is obtained. For a better comparison of the different scores, the scores may be normalized, e.g., so that zero becomes the neutral score. The scores of all fragments belonging to a complete list entry may then be added. It is also possible to consider the number and size of the fragments in calculating the entry scores. In one example, a neutral score may be calculated by matching a single wildcard symbol versus the result of the recognition. The difference may then be subtracted from all fragment scores to generate normalized scores. A fragment specific neutral score may also be used in which the fragment specific score depends on each fragment. For example, the fragment neutral score may be used if one wants to make use of expected scores for fragments to model the difference between the expected score versus the obtained score. The expected score may be the stochastic expected value for a score that was obtained by matching a fragment to a large variety of different speech inputs. For every speech input, the fragment is given a specific score. The mean value of all the specific scores for one fragment may be used as the fragment specific score. Accordingly after having calculated the score for each fragment in step 310, and after normalizing the scores in step 312, the scores for the different entries 110 may be calculated in step 314.

Figure 4:
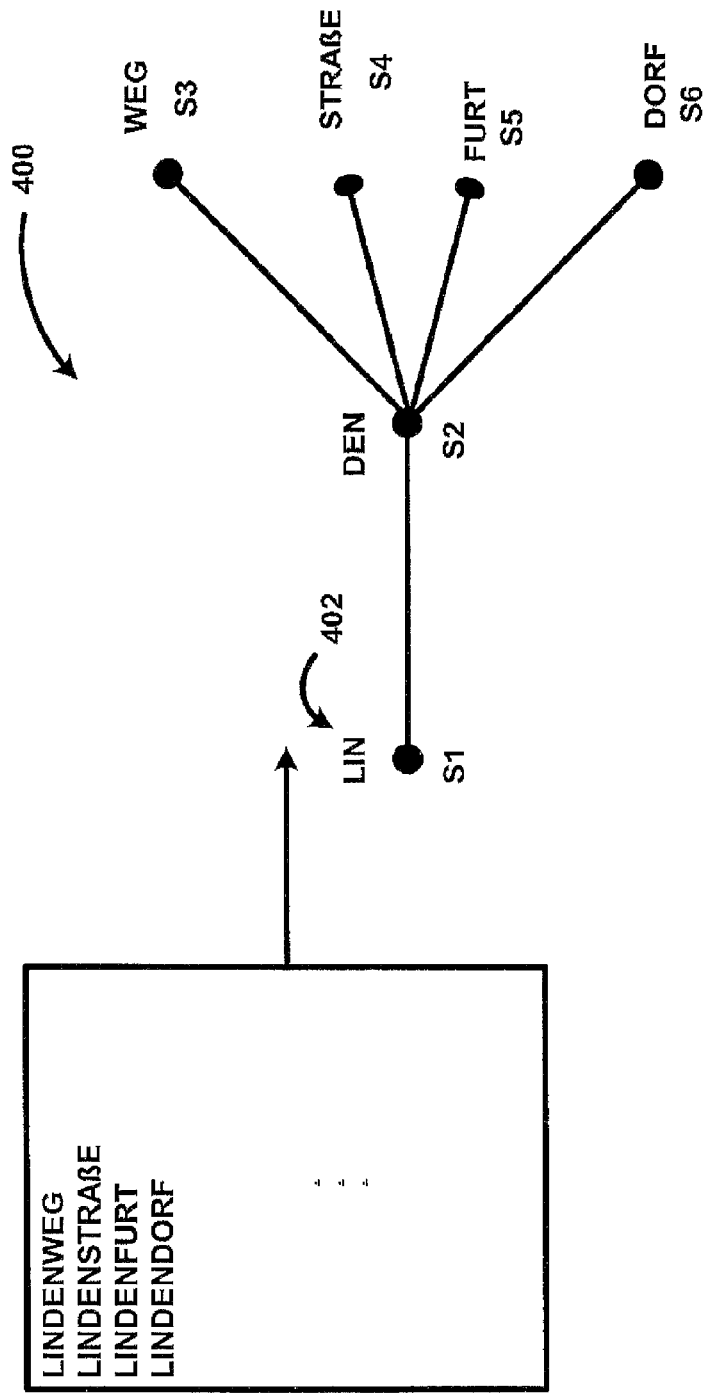
FIG. 4 shows an example of a tree-like structure of the fragments.

FIG. 4 shows an example of a tree-like structure of the fragments. FIG. 4 depicts an example of an organization of the fragments. In FIG. 4 shows four different list entries: Lindenweg, Lindenstrasse, Lindenfurt, Lindendorf. A tree-like structure may be used to store a complete list 108, and for the calculation of the scores. The list 108 of entries 108 have the following fragments Lin|den|furt, Lin|den|dorf, Lin|den|strasse, Lin|den|weg. The score of Lindenfurt may be the score of Lin plus the score of den plus the score of furt corresponding to the score of Linden plus the score of furt. As shown in FIG. 4, the fragment 402, which is "Lin," may have a first score s1. The fragment "den" may have a second score s2, and so on. In order to calculate the score for the four different entries, the score of lin and den is added once, so that for the determination of the scores for the four different list entries, only five adding operations may be performed.

Instead of using a single score 's' per fragment, a position-based score for the fragments may also be used. A position-based score would mean that the score for fragment A plus fragment B does not correspond to the score of fragment B plus fragment A.

When the fragment-based score is known, the scores for the complete list 108 of entries 110 may be known and the list of best matching entries may be calculated by sorting the list 108 based on the scores.

Persons skilled in the art will understand and appreciate that one or more processes, sub-processes, or process steps described in connection with FIGS. 2-4 may be performed by hardware and software. Additionally, the speech recognition system 100 in FIG. 1 may be implemented in software that would be executed within a microprocessor, general purpose processor, combination of processors, and/or ASICs. If a process, sub-process, or process step is performed by software, the software may reside in software memory located in a system implementing the speech recognition system 100. For example, the software may reside in memory implemented in a navigation system in a vehicle and use a general processor that controls the navigation system, or a dedicated processor. The software in software memory may include an ordered listing of executable instructions for implementing logical functions (i.e. "logic"), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus or device. The computer-readable medium may selectively be, for example, but not limited to, an electronic, magnetic, optical, electromagnetic, infrared, or semiconductor system, apparatus, or device. More specific examples, i.e., "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable memory may even be paper or another suitable medium upon which the program is printed, as the program can be electronically captured, via for instance, optical scanning of the paper or other medium, then compiled, interpreted, or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A speech recognition method in which an entry corresponding to a speech input is selected from a list of entries, the method comprising:
   detecting the speech input;
   recognizing a phoneme sequence of the speech input;
   providing a list of fragments of entries in a list of entries, the fragments being based on a subword or phoneme level; and
   comparing the phoneme sequence of the recognized speech input to the list of fragments to generate a candidate list of best matching entries based on comparison scores,
   wherein a comparison score is calculated for a fragment when the recognized speech input is compared to the fragment, the comparison score being a measure of how well the recognized speech input fits to the fragment, wherein a score for one list entry is calculated based on the comparison scores of all the fragments that build the list entry,
   where the fragment is accompanied by different wildcards, each wildcard representing the part of the list entry not considered in the fragment of the list entry and each wildcard having a different weight when the recognized speech input is compared to the fragment.

2. The method of claim 1, where at least one fragment is provided for each entry of the list.

3. The method of claim 1 further comprising:
   providing a list of fragments containing substantially all different fragments of the entries, where for generating the candidate list, the recognized speech input is compared to the list of fragments.

4. The method of claim 3 further comprising calculating a score for each fragment of the list of fragments.

5. The method of claim 1 further comprising calculating a score for one entry by adding the scores of the fragments that form the entry.

6. The method of claim 1 further comprising adding wildcards to one side of the fragment, to the other side of the fragment or to both sides of the fragment.

7. The method of claim 1 further comprising selecting the wildcard in such a way that the wildcard matches substantially uniformly against any recognized speech input.

8. The method of claim 1 further comprising:
   when the wildcard is provided only on one side of the fragment, determining:
   on which side of the fragment the wildcard is not provided, where the corresponding side of the recognized speech input is determined, where the matching of the recognized speech input to the fragment is substantially carried out based on a part of the recognized speech input provided on said corresponding side of the recognized speech input.

9. The method of claim 1 further comprising:
   when the wildcard is only provided on one side of the fragment, determining the corresponding side of the recognized speech input; and
   applying a pruning mechanism to the other side of the recognized speech input.

10. The method of claim 1 further comprising:
    normalizing the scores calculated when matching the recognized speech input to the list of fragments; and
    adding the normalized scores to calculate the score of each entry.

11. The method of claim 1 further comprising:
    calculating a neutral score by matching the at least one wildcard versus the recognized speech input, the neutral score being subtracted from all scores calculated for the different fragments.

12. The method of claim 1 further comprising providing the fragments in a tree like structure.

13. The method of claim 12 further comprising adding the scores for the different fragments building the list of entries on the basis of the tree like structure of the fragments.

14. The method of claim 1 further comprising calculating position based scores for the fragments, in which the score for a fragment depends on the position of the fragment in the entry.

15. The method of claim 1 further comprising using the candidate list of best matching entries determined on the basis of fragments of the entries as a basis for a recognition step.

16. The method of claim 1, where the entries include at least one of the following information:
personal names, addresses, city names, street names, points of interest, song titles.

17. The method of claim 1 further comprising generating the list of best matching entries by sorting the entries according to the calculated score, the n entries having the best score building the candidate list.

18. The method of claim 1 further comprising using a context sensitive Levenshtein algorithm to match the recognized speech input to the fragments of the entries.

19. The method of claim 11 further comprising calculating a fragment specific neutral score to calculate the neutral score, the score for the entries being calculated on the basis of the fragment specific scores.

20. The method of claim 1 further comprising comparing the recognized speech input to at least
some of the complete entries in order to generate the candidate list.

21. The method of claim 1 further comprising fragmenting the entries into fragments on a sub-word
unit level.

22. The method of claim 1, where the entry comprises a combination of a city name and a street name and a fragmentation into fragments is at least carried out between city name and street
name.

23. The method of claim 1 further comprising selecting the fragments of the entries in such way that the fragments for one entry overlap.

24. The method of claim 1 further comprising selecting the fragments of the entries in such a way that the fragments cover only a part of the entry.

25. The method of claim 1 further comprising storing the entries together with wildcards, where the wildcards are indicative that a user's utterance for selecting one entry from the list of entries contains more than the entry itself.

26. A speech recognition system in which a speech input is used to select an entry from a list of entries, the system comprising:
a data base having a list of entries and a list of fragments, each fragment representing a part of one entry; and
a hardware-based speech recognition module configured to recognize a speech input and to compare the recognized speech input to the list of entries in order to generate a candidate list of best matching entries based on the comparison result, where the speech recognition module compares the recognized speech input to the list of fragments in order to generate the candidate list
where the fragment is accompanied by different wildcards, each wildcard representing the part of the list entry not considered in the fragment of the list entry and each wildcard having a different weight when the recohnized speech input is compared to the fragment.

27. A non-transitory computer readable medium having logic configured for execution in a speech recognition system, the logic comprising:
logic for detecting the speech input;
logic for recognizing a phoneme sequence of the speech input;
logic for providing a list of fragments of entries in a list of entries, the fragments being based on a subword or phoneme level; and
logic for comparing the phoneme sequence of the recognized speech input to the list of fragments to generate candidate list of best matching entries
wherein a comparison score is calculated for a fragment when the recognized speech input is compared to the fragment, the comparison score being a measure of how well the recognized speech input fits to the fragment, wherein a score for one list entry is calculated based on the comparison scores of all fragments that build the list entry and where the fragment is accompanied by different wildcards, each wildcard representing the part of the list entry not considered in the fragment of the list entry and each wildcard having a different weight when the recognized speech input is compared to the fragment.

* * * * *